United States Patent
Toms et al.

(10) Patent No.: US 12,274,367 B1
(45) Date of Patent: Apr. 15, 2025

(54) MANUAL PRESSURE CONTROL VALVE PENDANT FOR PNEUMATIC MATTRESS FOR MEDICAL BED

(71) Applicant: LINET spol. s r.o., Slaný (CZ)

(72) Inventors: Martin Paul Toms, Hampshire (GB); Ian Ryall, Hampshire (GB)

(73) Assignee: LINET spol. s r.o., Slany (CZ)

( * ) Notice: Subject to any disclaimer, the term of this patent is extended or adjusted under 35 U.S.C. 154(b) by 409 days.

(21) Appl. No.: 17/697,594

(22) Filed: Mar. 17, 2022

Related U.S. Application Data

(60) Provisional application No. 63/168,305, filed on Mar. 31, 2021.

(51) Int. Cl.
| | | |
|---|---|---|
| *A47C 27/08* | (2006.01) | |
| *A47C 27/10* | (2006.01) | |
| *G05D 16/04* | (2006.01) | |

(52) U.S. Cl.
CPC ............ *A47C 27/083* (2013.01); *A47C 27/10* (2013.01); *G05D 16/0404* (2019.01)

(58) Field of Classification Search
CPC ..... A47C 27/08; A47C 27/081; A47C 27/082; A47C 27/083; A47C 27/084; A47C 27/088; A47C 27/10; G05D 16/0404
See application file for complete search history.

(56) References Cited

U.S. PATENT DOCUMENTS

| | | | | |
|---|---|---|---|---|
| 4,869,733 A | * | 9/1989 | Stanford | G05D 16/0404 95/138 |
| 4,897,890 A | * | 2/1990 | Walker | A47C 27/10 5/713 |
| 4,979,249 A | * | 12/1990 | Meade, II | A47G 9/1027 5/644 |
| 4,993,447 A | * | 2/1991 | Camire | G05D 16/163 137/118.03 |
| 4,993,920 A | * | 2/1991 | Harkleroad | A47C 27/082 417/63 |
| 5,150,767 A | * | 9/1992 | Miller | A47C 27/081 182/48 |
| 5,708,999 A | * | 1/1998 | Priolo | A47G 9/1027 5/644 |
| 6,088,643 A | * | 7/2000 | Long | A47C 4/54 297/284.3 |
| 9,756,956 B1 | * | 9/2017 | Pekkinen | A47C 27/18 |
| 2003/0208848 A1 | * | 11/2003 | Flick | A61G 7/05769 5/713 |
| 2004/0222684 A1 | * | 11/2004 | VanSickle | A47C 4/54 297/452.41 |
| 2007/0141869 A1 | * | 6/2007 | McNeely | H04L 5/1461 439/76.1 |
| 2008/0028534 A1 | * | 2/2008 | Wilkinson | A61G 7/05769 5/713 |
| 2008/0181795 A1 | * | 7/2008 | Feingold | F04B 39/121 417/282 |

(Continued)

*Primary Examiner* — George Sun
(74) *Attorney, Agent, or Firm* — Thedford I Hitaffer; Hitaffer & Hitaffer, PLLC

(57) ABSTRACT

A controller controlling zones of a multi-zone pneumatic mattress comprises a plurality of variable pressure reducing valves, and may be either manually operated, and includes plug-in connectors for removal connection to plural air circuits of the mattress. A single master control can operate the variable pressure reducing valves simultaneously.

9 Claims, 3 Drawing Sheets

(56) References Cited

U.S. PATENT DOCUMENTS

| | | | |
|---|---|---|---|
| 2009/0107560 A1* | 4/2009 | Johnston | G05D 16/0404 |
| | | | 137/113 |
| 2010/0043148 A1* | 2/2010 | Rose | A47C 27/18 |
| | | | 5/711 |
| 2010/0278659 A1* | 11/2010 | Wang | F04B 49/022 |
| | | | 417/43 |
| 2010/0281618 A1* | 11/2010 | O'Reagan | A61G 7/05769 |
| | | | 5/709 |
| 2011/0258782 A1* | 10/2011 | Call | A61G 5/1043 |
| | | | 137/15.01 |
| 2014/0109319 A1* | 4/2014 | Wilkinson | A47C 27/088 |
| | | | 5/713 |
| 2018/0160821 A1* | 6/2018 | Chapin | A47C 27/083 |
| 2018/0311089 A1* | 11/2018 | Sachdev | A61G 7/05769 |
| 2019/0117152 A1* | 4/2019 | Ribble | A61B 5/6892 |
| 2020/0386245 A1* | 12/2020 | Slattery | F15B 11/167 |
| 2022/0133054 A1* | 5/2022 | Tsern | A47C 21/042 |
| | | | 5/710 |
| 2022/0133563 A1* | 5/2022 | Audic | A61G 7/001 |
| | | | 5/607 |
| 2022/0274575 A1* | 9/2022 | Ganzel | B60T 8/176 |
| 2023/0026991 A1* | 1/2023 | Sugano | B01D 35/005 |

* cited by examiner

MANUAL PRESSURE CONTROL VALVE PENDANT FOR PNEUMATIC MATTRESS FOR MEDICAL BED

CROSS-REFERENCE TO RELATED APPLICATIONS

This application claims priority to U.S. Application No. 63/168,305, filed on Mar. 31, 2021, the disclosure of which is incorporated herein by reference in its entirety.

BACKGROUND OF THE INVENTION

This invention relates in general to pneumatic mattresses, for example, for medical or hospital beds, and more particularly, to controllers for controlling pneumatic pressures, particularly, within zones of a pneumatic reactive mattress.

Medical beds, particularly hospital beds, may be provided with pneumatic mattresses, which may have a plurality of inflatable zones. An example of such a mattress may be a reactive mattress, which may have foam and pneumatic components, which are adapted to provide passive and/or active therapy. Such a mattress may be comprised of pneumatic cells filled with foam, which provide passive therapy in the form of pressure redistribution in a non-powered mode by allowing air to move from cell to cell in reaction to the patient's body movement and weight distribution to minimize both intensity and duration of pressure exposure to vulnerable skin sites that are not adapted to sustained and/or excessive loading. Such a mattress can be connected to an air source (e.g., a compressor, pump or other air source) to provide active therapy, such as alternating pressure therapy, to enhance and optimize pressure redistribution and pressure injury prevention. During alternating pressure therapy, the compressor inflates and deflates the pneumatic cells to maintain a desired pressure regardless of the patient's weight distribution and position. Mattresses may also be fully active, relying on the air source for maintaining pressure in the mattress, and having no foam in the cells.

Exemplary mattresses may be comprised of individual cells, which may extend laterally of the mattress (i.e., in a side-to-side direction), and/or longitudinally of the mattress (i.e., is a lengthwise direction), and zones, which may correspond to a major portion of the body of the patient, such as, for example, back, seat and leg portions.

Pressures may change with changes in body position of the patient. This can result in decubitus ulcers and other issues, especially for long term bed occupants. Pressures of each zone may be managed with appropriate pressure management so as to provide appropriate support for the body of the patient to overcome or mitigate the risk of decubitus ulcers, which might otherwise develop.

Automated pressure control systems have been developed to address the development of decubitus ulcers and other undesirable issues. While automated systems work, they entail undesirable complications and expenses relating to medical beds. There remains a need for less complicated and less costly solutions to control pressure.

SUMMARY OF THE INVENTION

The present invention relates to a control valve pendant for manually controlling pneumatic pressures within a mattress. The control valve pendant is configured to plug directly into the mattress. The control valve pendant comprises a manual actuator enabling control of air from the mattress.

The present invention provides improved elements and arrangements thereof by an apparatus for the purposes described, which are inexpensive, dependable and fully effective in accomplishing its intended purposes.

Other advantages of this invention will become apparent to those skilled in the art from the following detailed description of the preferred embodiment, when read in light of the accompanying drawing.

BRIEF DESCRIPTION OF THE DRAWING

Various features and attendant advantages of a mattress and a control valve pendant combination will become more fully appreciated when considered in view of the accompanying drawings, in which like reference characters designate the same or similar parts and/or features throughout, and wherein.

The drawings are diagrammatic rather than literal depictions of their content, do not purport to show all structure or every component that would be present in a real-world model, and are not necessarily drawn to scale.

DETAILED DESCRIPTION OF THE PREFERRED EMBODIMENT

Figure 1:
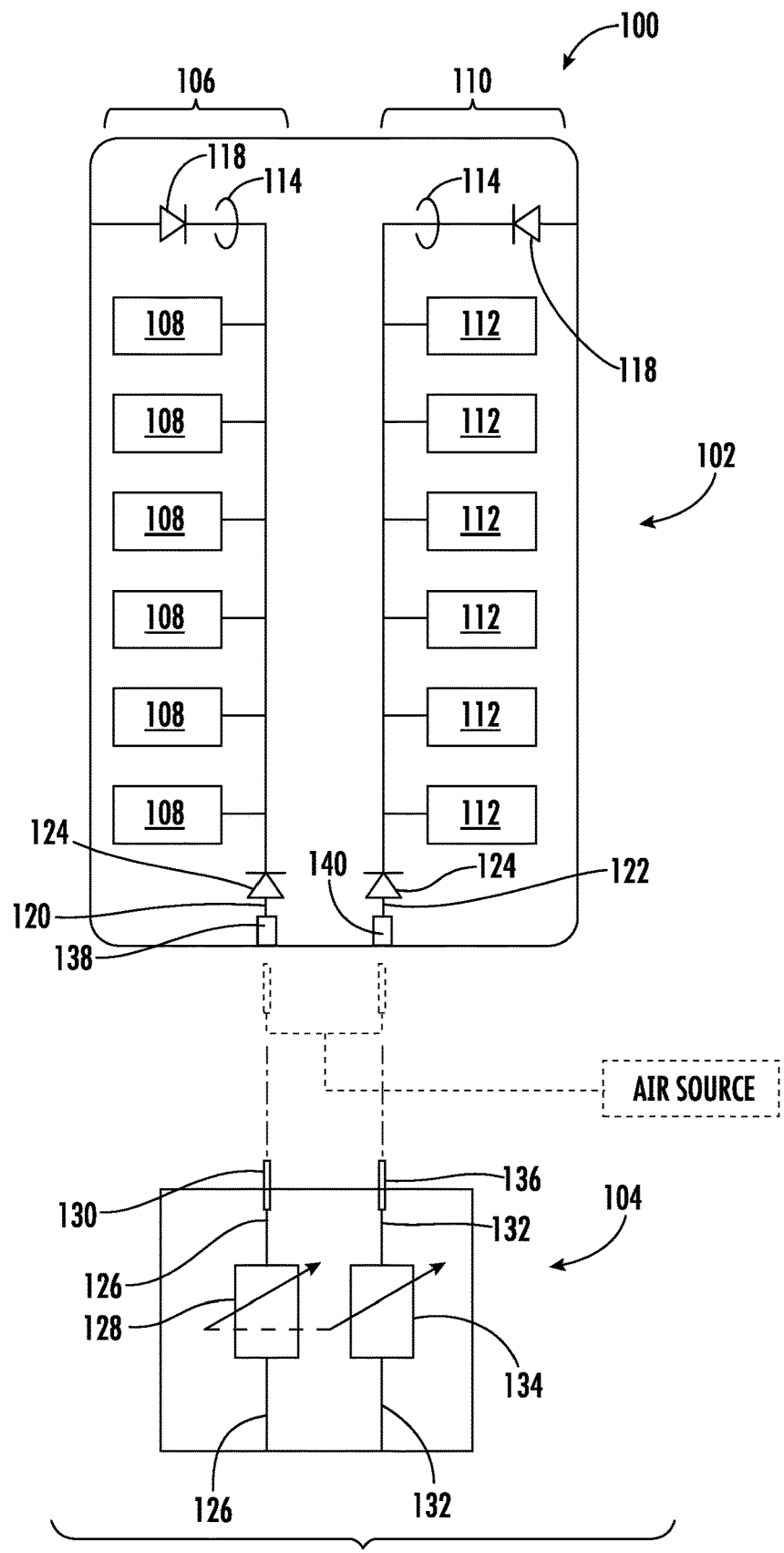
FIG. 1 is a diagrammatic view of an exemplary mattress and an exemplary control valve pendant connectable to the mattress in the place of an air source for manually controlling pneumatic functions of the mattress.

Referring now to the drawing, there is illustrated in FIG. 1 a combination 100 comprising a pneumatically inflatable mattress 102 and a manual pressure control valve pendant 104 for adjusting air pressure within the mattress 102.

The term "pendant" in the context of this description may refer to a separate, supplemental or auxiliary control (e.g., control block or feature), which may be fitted or otherwise engageable with the mattress by a user. The pendant may be portable, formed of unitary construction, and be configured to releasably plugged into the mattress 102, as will become apparent in the description below.

The mattress 102 may be in the form of a reactive mattress, which may be comprised of cells 108 and 112, which may comprise foam and pneumatic components. For example, the mattress may be comprised of pneumatic cells filled with foam, which provided passive therapy by allowing air to move from cell to cell in a non-powered mode in reaction to the patient's body movement and weight distribution. The mattress may also be connected to an air source (e.g., a hand pump to establish a static pressure within the mattress, and/or a compressor, pump or other suitable air source to provide active therapy, such as alternating pressure therapy, to enhance and optimize pressure distribution and pressure injury prevention).

The mattress 102 may include a plurality of zones, for example, including a first zone 106 having one or more first pneumatic cells 108 and a second zone 110 having one or more second pneumatic cells 112.

Figure 2:
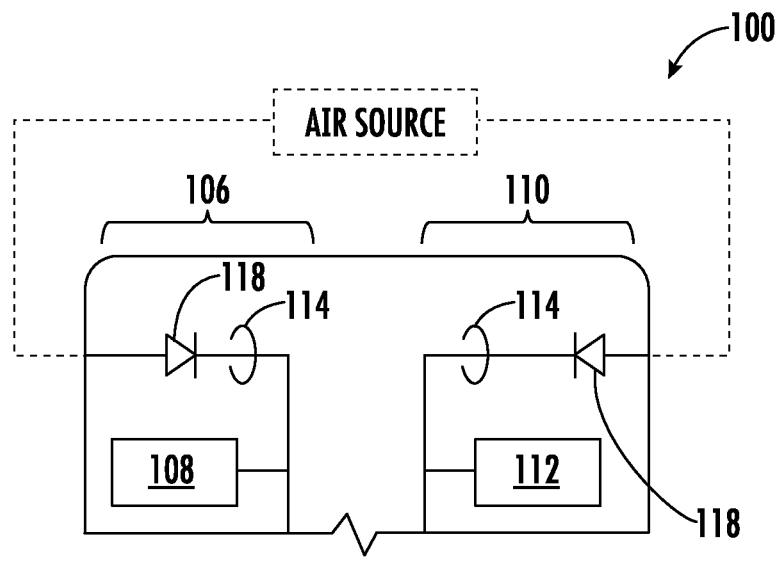
FIG. 2 is a diagrammatic view of a relevant portion of the mattress shown in FIG. 1 with an air source optionally connected to an alternate location of the mattress.

One or more inlet check valves 118 may be connected to air supply conduits 114 for regulating or controlling air in the air supply conduits 114 to the cells 108 and 112 (e.g., automatically allowing air into the cells 108 and 112 as needed to properly inflate the cells 108 and 112 (e.g., before a patient is placed on mattress, or by virtue of the patient moving around on the mattress, creating a vacuum, or by use of an air source (e.g., a hand pump) connectable to the inlet check valves 118, as shown in broken line in FIG. 2. In the illustrated embodiment, two zones 106 and 110 are provided, so two inlet check valves 118 and two air supply conduits 114 are correspondingly provided. It should be appreciated that additional inlet check valves 118 and additional air supply conduits 114 may be provided if additional zones are provided.

First and second air supply circuits 120 and 122 may be connected to corresponding air supply conduits 114 so as to be in fluid communication with pneumatic cells 108 and 112 of respective zones 106 and 110. The air supply circuits 120 and 122 may connected to the air source (e.g., a compressor, pump or other suitable air source), as shown in broken line in FIG. 1, to supply air to the cells 108 and 112, as desired, for example, to provide active therapy, as mentioned above. The air source may be configured to be removably connected to the air supply circuits 120 and 122 via respective first and second sockets 138 and 140, which are in fluid connection with the first and second air supply circuits 120 and 122.

Check valves 124 may be provided to prevent unintended escape of air from the cells 108 and 112 via the conduits 114 through the air supply circuits 120 and 122 when the air source is disconnected from the sockets 138 and 140. That is to say, the check valves 124 would be closed when the air source is not connected to the air supply circuits 120 and 122 and open when the air source is connected to the air supply circuits 120 and 122. In the illustrated embodiment, two zones 106 and 110 are provided, so two check valves 124 are provided (i.e., one for each zone 106 and 110). It should be appreciated that additional check valves 124 may be provided if additional zones are provided.

The manual pressure control valve pendant 104 is separable from the mattress 102 and is configured to be plugged into the first and second sockets 138 and 140 by way of first and second plug-in connectors 130 and 136 in the place of the air source when the air source is disconnected, as shown in the drawing.

The control valve pendant 104 may include a first pneumatic fluid circuit 126 having a first variable pressure reducing valve 128 in fluid connection with the first plug-in connector 130, which, of course, may be matingly compatible or engageable with the first air supply circuit 120 via the first socket 138. A second pneumatic fluid circuit 132 may have a second variable pressure reducing valve 134 in fluid connection with the second plug-in connector 136, which, of course, may be matingly compatible or engageable with the second air supply circuit 122.

The control valve pendant 104 has at least one manually actuated functionality. For example, control of the variable pressure reducing valves 128 and 134 may be simultaneously controlled by a single manual input device, such as, a knob, pushbutton, lever or other suitable device. In an exemplary embodiment, the valves 128 and 134 are mechanically interlocked together so as to be operatable in tandem (i.e., together), as indicated in broken line in FIG. 1.

The manual shut off actuators may have mechanical linkages (diagrammatically represented by a broken line in the drawings) enabling an operation as described herein. Consequently, the control valve pendant 104 may comprise a manual shut off actuator arranged to control both the first variable pressure reducing valve 128 and the second variable pressure reducing valve 134 simultaneously.

It should be appreciated that air pressure may be adjusted by releasing pressurized air from the air supply conduits 114. Adjustment could then be accomplished using the control valve pendant 104 to reduce pressure from a maximum or from a prevailing pressure above a desired pressure by releasing air from the air supply conduits 114. Desired pressures may also be maintained by the check valves 118. For example, the check valves 118 may regulate or control air entering into the air supply conduits 114 to the cells 108 and 112, while the valves 128 and 134 control air pressure (e.g., release pressure) at the point of connection with the removable air source.

The air supply conduit 114 may represent an air source system in its entirety and should not be construed narrowly as signifying only one or several segments of conduit. The air source circuit 120 may be regarded as part of the air supply conduit 114, and thus is only represented semantically rather than a structural distinction.

The first plug-in connector 130 may be frictionally or otherwise interlockingly retained within a corresponding first socket 138, such that the first plug-in connector 130 may be manually installed and removed from socket 138. Similarly, the second plug-in connector 136 may be frictionally or otherwise interlockingly retained within a corresponding second socket 140, such that the second plug-in connector 136 may be manually installed and removed from socket 140.

Figure 3:
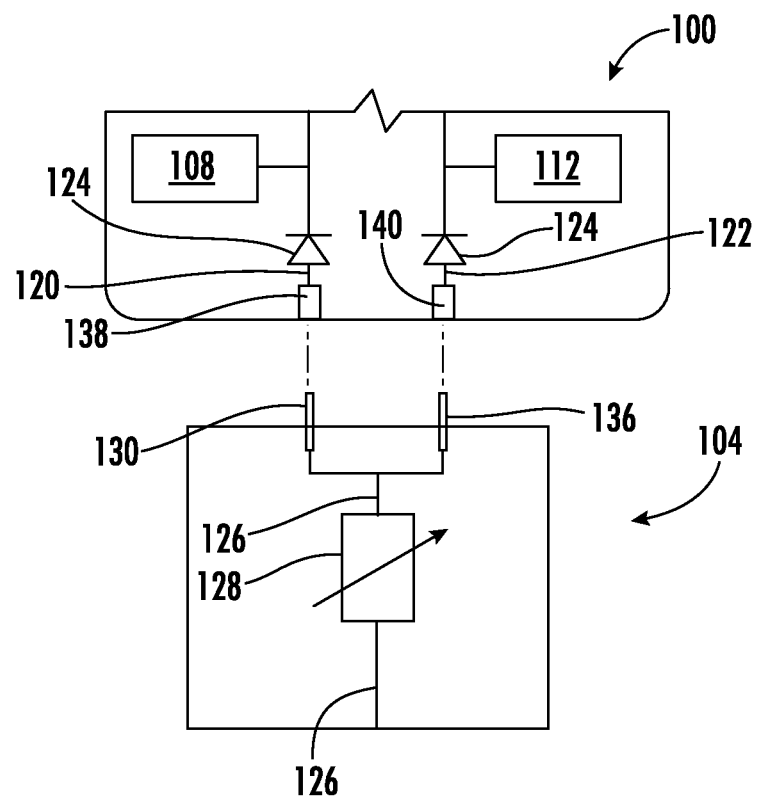
FIG. 3 is a diagrammatic view of a relevant portion of the mattress shown in FIG. 1 and an exemplary control valve pendant in a modified form.
Figure 4:
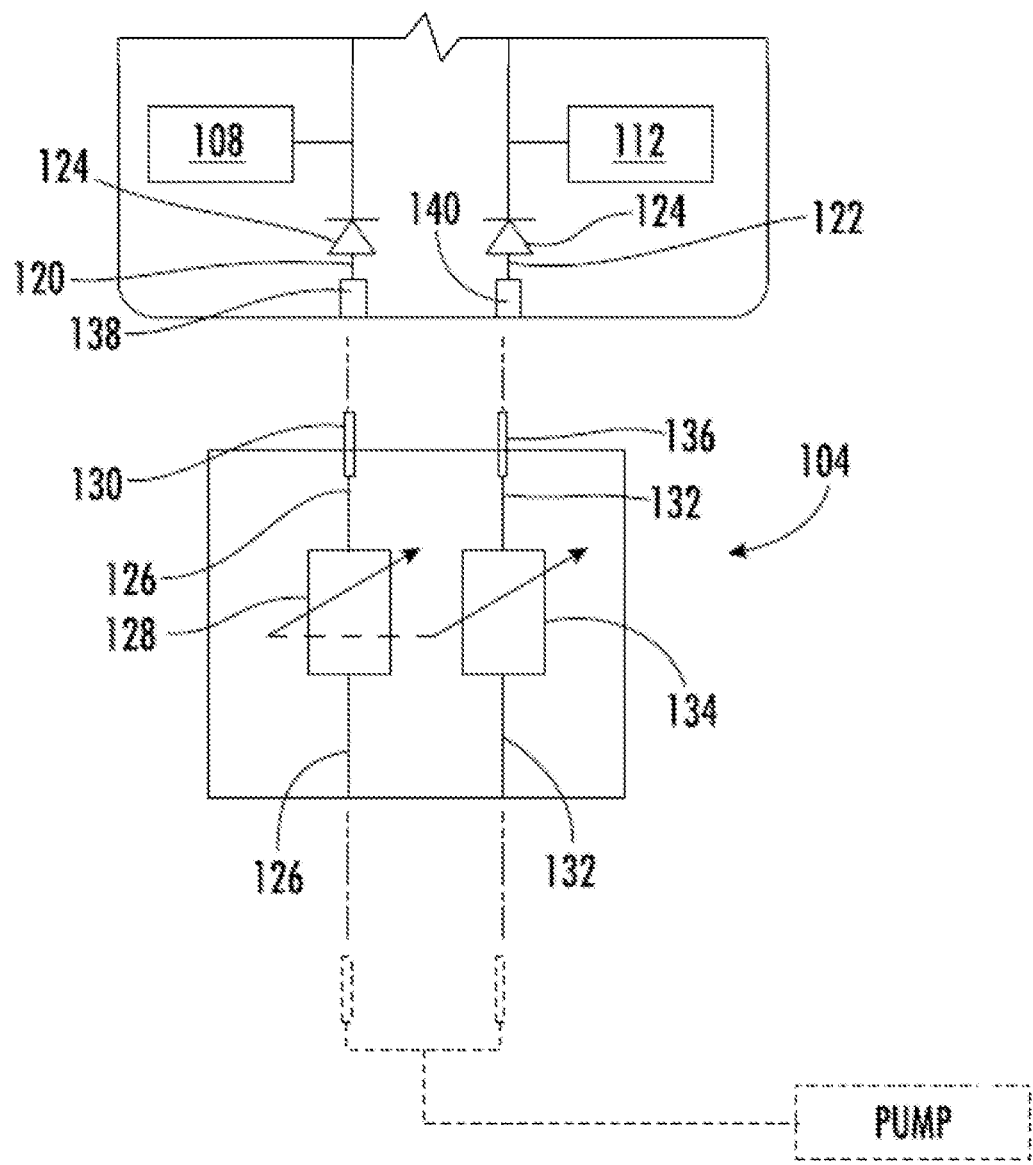
FIG. 4 is a diagrammatic view of a relevant portion of the mattress shown in FIG. 1 with an alternative option for connecting an air source.

Plug-in capability of the various embodiments of the control valve pendant 104 may depend on appropriate alignment of the first and second plug-in connectors 130 and 136 and the respective sockets 138 and 140, which receive the connectors 130 and 136. To this end, the first pneumatic fluid circuit 126 may include a first terminal portion (identified in FIG. 1 as first the air supply circuit 120) and a second pneumatic fluid circuit 132 that includes a second terminal portion (the second air supply circuit 122 in FIG. 1), which may be parallel to the first terminal portion and located within a predetermined distance of the first terminal portion. Thus, the first plug-in connector 130 can be connected to the first terminal portion of the first pneumatic fluid circuit 126 and the second plug-in connector 136 can be connected to the second terminal portion of second pneumatic fluid circuit 132 simultaneously in a single manual maneuver by a person connecting the control valve pendant 104 to the mattress 102. Reference to the first and second terminal portions of respective the first and second pneumatic fluid circuits 126 and 132 may be a semantic convenience rather than implying discrete physical entities. Also, the distance may vary. For example, in an exemplary embodiment, the first and second plug-in connectors 130 and 136 may be Siamese (e.g., bifurcated) as fabricated, and may be tethered to control valve pendant 104 and appropriately configured to connect with the sockets 138 and 140 with the control valve pendant 104 spaced apart from the mattress 102 via the tether. It should be appreciated that the first and second plug-in connectors 130 and 136 may also be spaced as far apart as the width of control valve pendant 104 permits. In some implementations, the first and second supply circuits may join one another, with corresponding modifications to the control valve pendant 104, where all zones of pneumatic cells may have pressure reduced identically. For example, the control valve pendant would need only one variable pressure reducing valve 128, as shown in FIG. 3.

It should be appreciated that the air source could also be configured to connect to the pendent air outlets 126, 132 so that the pendent forms the air connection path to the mattress for the pump. While the air source is connected, the pendent will have no effect on the mattress air pressures, as the valves 128, 134 may be fully open, but once the air source is disconnected, the pendent will take over control of the air cell air pressures.

The air source (e.g., a compressor, pump or other suitable air source) may be part of a bed associated with the mattress 102 or separate from the bed or the mattress 102. An air source may include all structure necessary for operation as described, such as, in the case of a pump or compressor, an electric motor and an electrical power/control circuit.

Unless otherwise indicated, the terms "first" "second", etc. are used herein merely as labels, and are not intended to impose ordinal, positional or hierarchical requirements on the features to which these terms refer. Moreover, reference to, for example, a "second" feature does not either require or preclude the existence of, for example, a "first" or lower-numbered feature, and/or, for example, a "third" or higher-numbered feature.

Although two zones 106 and 110 are discussed for illustration purposes, any number of zones may be provided in mattress 102. Any zone may have any number of desired pneumatic cells (e.g., pneumatic cells 108 and 112). Cells may be arranged other than as depicted herein, for example, in longitudinally and/or laterally arranged zones, and may be arranged in vertical layers. Consequently, the pendant may include any number of variable pressure reducing valves, each corresponding to a zone.

It should be mentioned at this point that the combination 100 expressly contemplates the inclusion of certain features in any feasible combination of other features. Notably, the controller 104 of FIG. 1 may be provided with hook, if desired, for hanging the controlled 104 in relation to the mattress 102. This may be particularly suitable when the controller 104 is tethered to the mattress 102.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST 100 combination
102 pneumatically inflatable mattress
104 manual pressure control valve pendant
106 first zone
108 first pneumatic cells
110 second zone
112 second pneumatic cells
114 air supply conduits
118 inlet check valves
120 first air supply circuit
122 second air supply circuit
124 check valves
126 first pneumatic fluid circuit
128 first variable pressure reducing valve
130 first plug-in connector
132 second pneumatic fluid circuit
134 second variable pressure reducing valve
136 second plug-in connector
138 first socket
140 second socket

What is claimed is:

1. A combination comprising:
a pneumatically inflatable mattress comprising:
a first zone having at least a first pneumatic cell,
at least a first air supply conduit in fluid communication with the first pneumatic cell,
at least a first air supply circuit in fluid communication with the first air supply conduit, the first air supply circuit being in fluid communication with an exterior of the mattress, and
at least a first check valve between the first air supply conduit and the first air supply circuit for interrupting the fluid communication therebetween; and
a pendant controller separable from the mattress, the pendant controller comprising:
at least a first pneumatic fluid circuit in fluid communication with a first variable pressure reducing valve, the first pneumatic fluid circuit being connectable in relation to the first air supply circuit, whereby the first variable pressure reducing valve is controllable to adjust air pressure within the first pneumatic cell, and
wherein the first check valve is closed when the first pneumatic fluid circuit is separated from the first air supply circuit by separating the pendant controller from the mattress and open when first pneumatic fluid circuit is connected in relation to the first air supply circuit by connecting the pendant controller from the mattress.

2. The combination of claim 1, wherein the first variable pressure reducing valve is manually controllable.

3. The combination of claim 1, wherein the pneumatically inflatable mattress further comprises a first socket in fluid communication with the first air supply circuit and the pendant controller further comprises a first plug-in connector in fluid communication with the first pneumatic fluid circuit and connectable with the first socket to connect the first pneumatic fluid circuit in relation to the first air supply circuit.

4. The combination of claim 1, wherein
the mattress further comprises:
a second zone having at least a second pneumatic cell,
a second air supply conduit in fluid communication with the second pneumatic cell,
a second air supply circuit in fluid communication with the second air supply conduit, the second air supply circuit being in fluid communication with an exterior of the mattress, and
a second check valve between the second air supply conduit and the second air supply circuit for interrupting the fluid communication therebetween; and
the pendant controller further comprises:
a second pneumatic fluid circuit in fluid communication with a second variable pressure reducing valve, the second pneumatic fluid circuit being connectable in relation to the second air supply circuit, whereby the second variable pressure reducing valve is operable to adjust air pressure within the second pneumatic cell, and
wherein the second check valve is closed when the second pneumatic fluid circuit is not connected in relation to the second air supply circuit and open when second pneumatic fluid circuit is connected in relation to the second air supply circuit.

5. The combination of claim 4, wherein the first variable pressure reducing valve and the second variable pressure reducing valve are manually controllable.

6. The combination of claim 5, wherein the pendant controller further comprises a manual shut off actuator arranged to control both the first variable pressure reducing valve and the second variable pressure reducing valve simultaneously.

7. The combination of claim 4, wherein the pneumatically inflatable mattress further comprises a first socket in fluid communication with the first air supply circuit and a second socket in fluid communication with the second air supply circuit, and wherein the pendant controller further comprises a first plug-in connector in fluid communication with the first pneumatic fluid circuit and connectable with the first socket to connect the first pneumatic fluid circuit in relation to the first air supply circuit, and a second plug-in connector in fluid communication with the second pneumatic fluid circuit and connectable with the second socket to connect the second pneumatic fluid circuit in relation to the second air supply circuit.

8. The combination of claim 4, wherein the pneumatically inflatable mattress is a reactive mattress comprising foam and pneumatic components, including pneumatic cells filled with foam, which provide passive and/or active therapy.

9. The combination of claim 1, wherein the pneumatically inflatable mattress is a reactive mattress comprising foam and pneumatic components, including pneumatic cells filled with foam, which provide passive and/or active therapy.

\* \* \* \* \*